United States Patent
Van Doorselaer et al.

(10) Patent No.: US 9,743,298 B2
(45) Date of Patent: Aug. 22, 2017

(54) METHOD FOR TESTING A WIRELESS COMMUNICATIONS NETWORK INCLUDING A STATION AND AN ACCESS POINT

(71) Applicant: THOMSON LICENSING, Issy de Moulineaux (FR)

(72) Inventors: Karel Van Doorselaer, Edegem (BE); Koen Van Oost, Borsbeek (BE); Sylvain Dumet, Concord, NC (US)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/386,325

(22) PCT Filed: Mar. 14, 2013

(86) PCT No.: PCT/EP2013/055275
§ 371 (c)(1),
(2) Date: Sep. 18, 2014

(87) PCT Pub. No.: WO2013/139679
PCT Pub. Date: Sep. 26, 2013

(65) Prior Publication Data
US 2015/0043371 A1    Feb. 12, 2015

(30) Foreign Application Priority Data
Mar. 19, 2012   (EP) ..................................... 12305320

(51) Int. Cl.
*H04L 12/26*   (2006.01)
*H04W 24/08*   (2009.01)
(Continued)

(52) U.S. Cl.
CPC .......... *H04W 24/08* (2013.01); *H04L 43/0829* (2013.01); *H04W 24/06* (2013.01); *H04W 84/12* (2013.01)

(58) Field of Classification Search
CPC ..... H04W 24/00; H04W 24/06; H04W 24/08; H04W 84/12; H04L 43/0829; H04L 43/0835; H04L 43/0841
See application file for complete search history.

(56) References Cited

U.S. PATENT DOCUMENTS 7,317,419 B2   1/2008  Sugar et al.
7,515,548 B2 *  4/2009  Chandra ............... H04W 24/00
                                                  370/252
(Continued)

FOREIGN PATENT DOCUMENTS

CN       101594552 A    12/2009
EP          2642783      9/2013
(Continued)

OTHER PUBLICATIONS

IEEE Standards Board, IEEE Std 802.11-1997, "Part 11: Wireless LAN Medium Access Control (MAC) and Physical Layer (PHY) specifications", The Institute of Electrical and Electronics Engineers, New York, NY, Jun. 26, 1997.
(Continued)

*Primary Examiner* — Kevin Mew
(74) *Attorney, Agent, or Firm* — Myers Wolin LLC

(57) ABSTRACT

The method for testing a wireless communications network including a station and an access point comprises the steps of sending broadcast packets from the station to the access point in a lower frequency band and waiting for confirmation, calculating a packet loss in the lower frequency band based on the number of sent and confirmed broadcast packets, and calculating a packet loss for a higher frequency band by taking into account the calculated packet loss of the (Continued)

lower frequency band and by using a correlation function between the lower frequency and the higher frequency band. The wireless communications network is in particular a communications network according to one of the IEEE 802.11 recommendations and the broadcast packets are in particular address resolution protocol packets.

17 Claims, 1 Drawing Sheet

(51) Int. Cl.
*H04W 24/06* (2009.01)
*H04W 84/12* (2009.01)

(56) References Cited

U.S. PATENT DOCUMENTS

| | | | |
|---|---|---|---|
| 7,787,384 B2 | 8/2010 | Rible | |
| 7,817,566 B2 | 10/2010 | Lee et al. | |
| 8,284,752 B2* | 10/2012 | Ketchum | H04L 29/06 370/349 |
| 8,503,388 B2* | 8/2013 | Ishii | H04L 1/0003 370/328 |
| 8,732,559 B2* | 5/2014 | Liu | H04L 1/0057 714/755 |
| 9,585,099 B1* | 2/2017 | Manchanda | H04W 52/0261 |
| 2002/0097681 A1* | 7/2002 | Treister | H04W 84/20 370/238 |
| 2002/0163933 A1* | 11/2002 | Benveniste | H04L 47/10 370/465 |
| 2002/0191558 A1* | 12/2002 | Agrawal | H04L 29/12018 370/329 |
| 2003/0161341 A1 | 8/2003 | Wu et al. | |
| 2004/0028003 A1* | 2/2004 | Diener | H04L 1/0001 370/319 |
| 2004/0076138 A1* | 4/2004 | Serceki | H04L 1/243 370/349 |
| 2004/0117498 A1* | 6/2004 | Hashimoto | H04L 1/08 709/230 |
| 2005/0020299 A1* | 1/2005 | Malone | H04W 48/18 455/552.1 |
| 2006/0067226 A1* | 3/2006 | Chandra | H04W 24/00 370/235 |
| 2006/0198325 A1* | 9/2006 | Gao | H04L 1/0057 370/270 |
| 2006/0224763 A1* | 10/2006 | Altunbasak | H04L 69/14 709/231 |
| 2007/0060150 A1 | 3/2007 | Hart | |
| 2007/0081462 A1* | 4/2007 | Gefflaut | H04W 28/08 370/235 |
| 2008/0014934 A1* | 1/2008 | Balasubramanian | H04W 84/12 455/434 |
| 2008/0232291 A1* | 9/2008 | Hus | H04L 1/0015 370/312 |
| 2008/0233955 A1* | 9/2008 | Narang | H04W 48/16 455/434 |
| 2009/0036058 A1 | 2/2009 | Huoviala | |
| 2009/0047984 A1* | 2/2009 | Gollamudi | H04W 72/048 455/513 |
| 2009/0245207 A1* | 10/2009 | Rao | H04W 36/04 370/332 |
| 2009/0262743 A1 | 10/2009 | Uyehara et al. | |
| 2010/0246416 A1 | 9/2010 | Sinha et al. | |
| 2010/0273426 A1* | 10/2010 | Walley | H04W 52/265 455/63.1 |
| 2010/0290355 A1* | 11/2010 | Roy | H04L 47/14 370/252 |
| 2011/0228829 A1* | 9/2011 | Kazarnovski | H04W 72/085 375/220 |
| 2011/0261732 A1* | 10/2011 | Tanno | H04W 16/14 370/281 |
| 2012/0099583 A1* | 4/2012 | Li | H04W 56/0085 370/350 |
| 2012/0327870 A1* | 12/2012 | Grandhi | H04W 28/06 370/329 |
| 2013/0315126 A1* | 11/2013 | Liu | H04L 1/1819 370/312 |

FOREIGN PATENT DOCUMENTS

| | | |
|---|---|---|
| JP | 2006-125951 A | 5/2006 |
| KR | 10-0861451 B1 | 10/2008 |

OTHER PUBLICATIONS

Tran et al., "Study on Area Expansion for Cellular System using Frequencies above 5GHz—Evaluation of Number Of Repeaters and System Cost depending on Frequencies", Institute of Electronics, Information and Communication Engineers (IEICE), Technical Report RCS2011-266, pp. 195-200, Dec. 15-16, 2011; with an English abstract only.

Kitao et al., "Path Loss in Suburban Area for 400MHz to 8GHz Band", Institute of Electronics, Information and Communication Engineers (IEICE), Proceedings of the 2005 IEICE General Conference, Osaka University, Toyonaka Campus, Toyonaka, Japan, Mar. 21-24, 2005, ISN 1349-1369.

* cited by examiner

METHOD FOR TESTING A WIRELESS COMMUNICATIONS NETWORK INCLUDING A STATION AND AN ACCESS POINT

This application claims the benefit, under 35 U.S.C. §365 of International Application PCT/EP2013/055275, filed Mar. 14, 2013, which was published in accordance with PCT Article 21(2) on Sep. 26, 2013 in English and which claims the benefit of European patent application No. 12305320.9, filed Mar. 19, 2012.

TECHNICAL FIELD

The invention relates to a method for testing a wireless communications network including a station and an access point, in particular to a method for calculating a packet loss between the station and the access point for determining a video quality.

BACKGROUND OF THE INVENTION

Wireless transmission for local area networks (WLAN) is in the meanwhile a well established technology for end users. An essential part of a local area network is a residential gateway connecting the local area network to the Internet. A mechanism for connecting wireless devices to a local area network is called Wi-Fi, which is a brand name for devices using the IEEE 802.11 family of standards for wireless transmission. The IEEE 802.11 standards, also called recommendations, define a residential gateway as a wireless access point, and a wireless device connected to the residential gateway is called a station. The IEEE 802.11 standards are defined such that wireless devices distributed all over a home can be connected to the residential gateway without requiring any data cables.

The IEEE 802.11b and 802.11g standards use the 2.4 GHZ ISM band, wherein the later developed 802.11g standard allows a data rate of up to 54 Mbit/s, which is even sufficient in principle for providing high quality video streaming for real time applications. But the Wi-Fi technology has become victim of its own success: even though there are several non-overlapping frequency channels that can be chosen for data transmission (four in Europe, three in US), interference from neighbouring Wi-Fi devices has become a serious problem in urban areas. In addition, there are also other devices using the 2.4 GHZ ISM band, for example Bluetooth devices, microwave ovens, babyphones and others.

It is therefore a consensus in the industry that video streaming over the 2.4 GHz ISM band will not work reliably, and that the 5 GHz U-NII band has to be used for avoiding interference. Further, the present 802.11g wireless devices are designed for data transport and do not have high quality video transmission in mind. They operate with a maximum physical layer bit rate of 54 Mbit/s, which provides about 22 Mbit/s average data throughput. In the meanwhile first companies producing Wi-Fi devices have started to work on dedicated 5 GHz Wi-Fi solutions, tuned specifically for video applications in accordance with the new IEEE 802.11n standard, which allow to specify a sufficient throughput and packet loss for a given radio frequency path in the 5 GHz band.

But for a user interested in such an application there is still the remaining problem, that he does not have any information about the RF path loss between a station and an access point intended for video transmission in his home. There exists also no reliable model to calculate the RF path loss based on the distance between the station and the access point including additional path loss by walls, cabinets or other obstacles. For example, the attenuation caused by a conventional concrete floor can be about 5 dB, but may be as well as 25 dB in case the concrete floor contains metallic screed reinforcement mesh, which is not visible to the user.

A user owns for example a Wi-Fi access point AP operating in the 2.4 GHz band in a room R1 of his home and a station STA1 in a room R2 at a location L1, e.g. a computer, as shown in FIG. 1. But he wishes to replace the current access point AP by an advanced 5 GHz video over Wi-Fi access point AP2, a residential gateway operating in the 5 GHz U-NII band, and use it with a 5 GHz video over Wi-Fi set-top box STA2 at a location L2. The set-top box STA2 has to be located close to a television set TV in the room R2.

Although the documentation of the new 5 GHz access point AP2 promises that it can guaranty a data throughput of 40 Mb/s and a packet loss below 10-16 packets/sec up to a path loss of 90 db, which allows viewing and recording of two different high resolution movies simultaneously, the user has no information whether the solution would actually work sufficiently in his house at the locations that he envisages for the residential gateway AP2 and the set-top box STA2. In the room R1, there may exist for example a chimney or a large cabinet C in the direct line between the residential gateway AP2 and the set-top box STA2. So the only way to find out would be either to buy the equipment in a store and hope that it operates at the wanted locations, or to have a site service conducted by the company offering the new access point AP2, if possible.

U.S. Pat. No. 7,317,419 describes a method for estimating a position of a target device emitting a radio frequency signal based on data pertaining to strength of an emission received from the target device. The position of the target device is estimated based on receive signal strength data associated with received emissions from the target device and from reference devices. The target device can be for example a device emitting energy that interferes with the operation of IEEE 802.11 WLAN devices, e.g. a microwave oven, a Bluetooth device or a cordless telephone. The method uses multiple path loss models, e.g. a path loss model for areas with low obstruction densities, and another path loss model for high obstruction densities. The specific coefficients for the path loss models can be found empirically.

BRIEF SUMMARY OF THE INVENTION

The invention describes a method for testing a wireless communications network including a station and an access point, the method comprising the steps of sending broadcast packets from the station to the access point in a lower frequency band and waiting for confirmation, calculating a packet loss in the lower frequency band based on the number of sent and confirmed broadcast packets, and calculating a packet loss for a higher frequency band by taking into account the calculated packet loss of the lower frequency band and by using a correlation function between the lower frequency and the higher frequency band.

The wireless communications network is in particular a communications network in accordance with one of the IEEE 802.11 recommendations, and the broadcast packets are sent without retransmissions with the lowest recommended modulation rate according to one of the IEEE 802.11 recommendations, for example with a modulation rate being within a range of 1 and 5 MHz.

In a further aspect of the invention, the method comprises the step of sending a unicast response message in response to a received broadcast packet for calculating a packet loss for the lower frequency band and converting the packet loss data into the lower frequency band by means of the correlation function for determining a video performance for the lower frequency band, wherein the broadcast packets are in particular address resolution protocol packets.

The station according to the invention utilizes the method for example by using computer executable program code included within the station. The computer executable program code for performing the method may be included within the station as a software program or may be stored within the station by copying the computer executable program code from a computer readable storage medium comprising the computer executable program code.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

It is to be understood that the figures and the description of the present invention have been simplified to illustrate elements that are relevant for a clear understanding of the present invention, while eliminating, for purposes of clarity, many other elements found in typical wireless delivery methods and systems. However, because such elements are well known in the art, a detailed discussion of such elements is not provided herein. The disclosure herein is directed to all such variations and modifications known to those skilled in the art. The exemplary embodiment comes within the framework of IEEE 802.11, but the invention is not limited to this particular environment and may be applied also within other wireless frameworks utilizing other frequencies.

The method of the present invention for testing a wireless communications network includes a station and an access point and uses broadcast packets for calculating a packet loss in a lower frequency band. Then, a packet loss is calculated for a higher frequency band by taking into account the calculated packet loss in the lower frequency band and by using a correlation function between the lower frequency and the higher frequency band. The wireless communications network is in particular a wireless network in accordance with one of the IEEE 802.11 recommendations and the lower frequency band the 2.4 GHz band and the higher frequency band the 5 GHz band.

Figure 1:
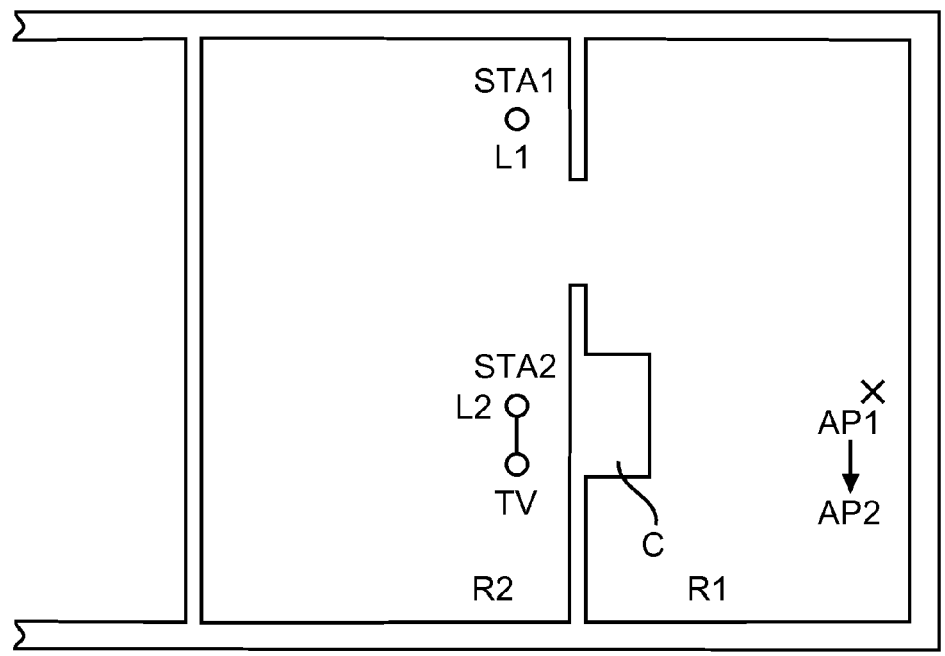
FIG. 1 a wireless communications network including a station and an access point arranged in a home of an end-user, and FIG. 2 a scenario for determining a packet loss in a 5 GHz band for a site as described with regard to FIG. 1.
Figure 2:
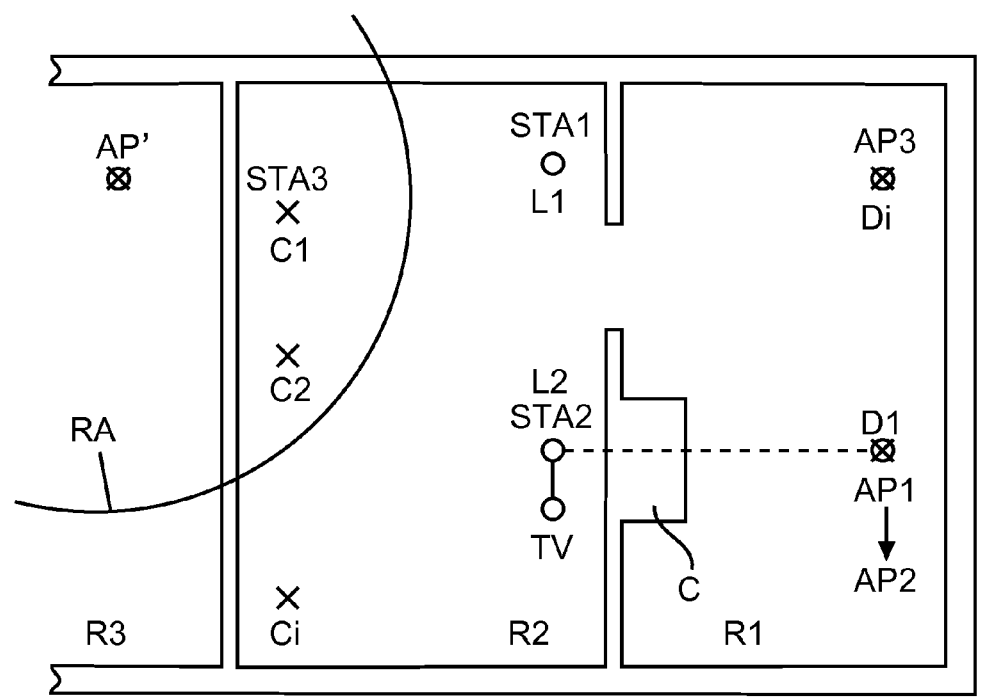

The method for testing a wireless communications network is illustrated now with regard to FIG. 2 showing an access point AP3 and a station STA3 for testing the site as described with regard to FIG. 1. The access point AP3 can be any old Wi-Fi access point and the station STA3 any old laptop having 2.4 GHz Wi-Fi in accordance with any one of the IEEE 802.11 recommendations, to test the radio path for determining the path loss and in particular a packet loss between envisaged locations for the new residential gateway AP2 and the new set-top box STA2 as described with regard to FIG. 1.

The method for testing a wireless communications network is provided for example as an application which can be installed on the station STA3, e.g. a laptop, a netbook or even a smartphone equipped with Wi-Fi, to determine the path loss for the radio path between the access point AP2 and the set-top box STA2. The station STA3 is moved around in the room R2 and all locations can be tested, which are interesting for a use of the set-top box STA2. Therefore, a multitude of measurements is made at locations Ci of the room R2 with the station STA3 in the 2.4 GHz band, for determining packet loss data for each location Ci. Corresponding measurements may be made also at several locations Di with the access point AP3.

The method for testing the wireless communications network has to be as much as possible independent of any existing interference in the 2.4 GHz band, which may be caused for example by a neighbour using an access point AP' in his apartment in a room R3. The range RA of the access point AP' is indicated in a simplified manner as a circle and covers a part of the room R2. The result for the path loss obtained in the 2.4 GHz band is then converted into a path loss in the 5 GHz band due to the good correlation for path loss between 2.4 and 5 GHz. By using broadcast packets, the solution is therefore independent of Wi-Fi interference in the 2.4 GHz band, but not of non-Wi-Fi interference. In that respect, the test will yield a pessimistic result in terms of predicted performance for the 5 GHz band.

The method for determining the path loss between the old residential gateway AP and the station STA3 is dependent on the radiated power of the station STA3 and the receive sensitivity of the access point AP, but is independent on implementation choices with regard to the algorithms effecting Wi-Fi performance, e.g. rate adaption and wireless retransmission algorithm. For the 5 GHz performance, the calculation will assume maximum legally allowed radiated power of the new access point AP2 and state of the art receive sensitivity of the new set-top STA2. The correlation between 5 GHz and the 2.4 GHz test results with state-of-the-art 2.4 GHz solution, obtained with the 2.4 GHz access point AP3 and the 2.4 GHz station STA3, at various locations having various radio paths, will allow to predict (in a pessimistic way) whether the 5 GHz solution will work sufficiently between two given locations, e.g. for the location of the new access point AP2 and the new set-top box STA2.

In more detail, the old 2.4 GHz access point AP3 can be of any model, no control over implementation or functionality is required. The access point AP3 can be for example even an old residential gateway in accordance with IEEE 802 11b. For the station STA3, e.g. a laptop, a netbook or a smartphone can be used, on which the test application is running. The test application can be downloaded from an Internet web page for example or can be provided via a service DVD.

Because of possible interferences in the 2.4 GHz band, the test method cannot make use of throughput tests or of round trip times. Also, because of the desire to limit constraints on the 2.4 GHz access point AP3 and the 2.4 GHz station STA3, the test method cannot make use of received signal strength indication (RSSI) values. The test method is based advantageously only on packet loss. The test method does not require to control the rate set used by the access point AP3 and the station STA3 and does not require a control over retransmission and retransmission limits, which have a huge impact on packet loss. The test method uses advantageously broadcast packets, e.g. address resolution protocol (ARP) packets, which are always sent at the lowest Wi-Fi modulation rate, e.g. the lowest IEEE 802.11b or 802.11g modulation rate, without retransmissions. The test method uses broadcast packets, which are selected such that confirmation or acknowledgement of receipt is fed back automatically to the sending station STA3.

The address resolution protocol is a telecommunications protocol used for resolution of network layer addresses into link layer addresses. The address resolution protocol defines a simple message format that uses one broadcast address resolution request and a unicast response from the sought-after receiving device back to the sender.

The station STA3 at a location Ci sends for example 2.4 GHz ARP broadcast packets to the access point AP3, and the access point AP3 sends a reply. Because the reply is a unicast message and therefore subject to retransmissions, the sending of the broadcast packets will be predominant for the packet loss, independent of the retransmission behavior of the access point AP3. From the number of sent broadcast packets and the number of receive messages, a packet loss in percent can be calculated for the location Ci.

The test application includes a correlation function which transforms in a next step the packet loss from the 2.4 GHz range to the 5 GHz range to provide an estimation about the 5 GHz Video Performance. First, the correlation function needs to be defined between a multitude of packet loss values 2.4RefAP3 and 2.4RefSTA3 at 2.4 GHz obtained at various locations Ci or/and Di and the 5 GHz packet loss values: The 2.4 GHz Prediction Test Result (2.4RefAP3@ LocationCi; 2.4RefSTA3@ LocationDi) yields a Yi % packet loss, and the VideoPerformance (5 GHzAP2@ LocationDi; 5 GHzSTA2@ LocationCi) will result in Zi Arbitrary Units. From the area (Yi, Zi), the correlation function can be fitted such that Zi can be approximated by Correlation Function (Yi).

When the user performs the 2.4 GHz prediction test in his house with his old equipment on the envisaged locations, he obtains a 2.4 GHz prediction test result, which is X % packet loss for the access point AP2 at the location D1 and the station STA2 at location L2. From the above, it can be reliably deduced that the video performance for the 5 GHz solution on the envisaged locations, the video performance for the 5 GHz access point AP2 at location D1 and the 5 GHz station STA2 at location L2 will be equal to or better than the correlation function (X).

This method has the advantage, that a user has a first estimation, whether a video transmission between an access point AP2 and a new station STA2 will work and where it will work, before he buys a new equipment. This test can be performed already with his old equipment, which can be any Wi-Fi certified 2.4 GHz residential gateway and any Wi-Fi certified laptop or netbook. No trial and error is required with the new equipment, and no on-site visit with special test equipment is necessary.

Reference numerals appearing in the claims are by way of illustration only and shall have no limiting effect on the scope of the claims. Features disclosed in the description, the claims and the drawings may be provided independently or in any appropriate combination, and may be implemented, were appropriate, in hardware, software or a combination of both. Also other embodiments of the invention may be utilized by one skilled in the art without departing from the scope of the present invention. The invention resides therefore in the claims herein after appended.

The invention claimed is:

1. A method for testing a wireless communications network including a station and an access point, comprising:
sending broadcast packets from the station to the access point in a first frequency band and waiting for confirmation;
calculating, by the station, a packet loss in the first frequency band based on a number of sent and confirmed broadcast packets; and
calculating, by the station, a packet loss for a second frequency band by taking into account the calculated packet loss in the first frequency band and by using a correlation function between a path loss in the first frequency band and a corresponding path loss in the second frequency band, wherein the first frequency band is lower than the second frequency band.

2. The method of claim 1, further comprising receiving, by the station, a unicast response message from the access point as confirmation in response to a received broadcast packet.

3. The method of claim 1, wherein the broadcast packets are address resolution protocol packets.

4. The method of claim 1, wherein the wireless communications network is a communications network in accordance with an IEEE 802.11 recommendation.

5. The method of claim 4, further comprising sending, by the station, the broadcast packets without retransmission with the lowest recommended modulation rate according to the IEEE 802.11 recommendation.

6. The method of claim 4, further comprising sending, by the station, the broadcast packets with a modulation rate being within a range of 1 and 5 MHz.

7. The method of claim 1, wherein the first frequency band is a 2.4 GHz industrial, scientific, and medical ("ISM") band, and the second frequency band is a 5 GHz Unlicensed National Information Infrastructure ("U-NII") band.

8. The method of claim 1, further comprising determining, by the station, a video performance for the second frequency band from the correlation function.

9. A station apparatus comprising:
a memory;
a processor coupled to the memory, the processor being configured to:
send broadcast packets in a first frequency band over a wireless communication network to an access point and waiting for confirmation;
calculate a packet loss in the first frequency band based on a number of sent and confirmed broadcast packets; and
calculate a packet loss for a second frequency band by taking into account the calculated packet loss in the first frequency band and by using a correlation function between a path loss in the first frequency band and a corresponding path loss in the second frequency band, wherein the first frequency band is lower than the second frequency band.

10. The station apparatus of claim 9, wherein the processor is further configured to receive a unicast response message from the access point as confirmation in response to a received broadcast packet.

11. The station apparatus of claim 9, wherein the broadcast packets are address resolution protocol packets.

12. The station apparatus of claim 9, wherein the wireless communications network is a communications network in accordance with an IEEE 802.11 recommendation.

13. The station apparatus of claim 12, wherein the processor is further configured to send the broadcast packets without retransmission with the lowest recommended modulation rate according to the IEEE 802.11 recommendation.

14. The station apparatus of claim 12, wherein the processor is further configured to send the broadcast packets with a modulation rate being within a range of 1 and 5 MHz.

15. The station apparatus of claim 9, wherein the first frequency band is a 2.4 GHz industrial, scientific, and medical ("ISM") band, and the second frequency band is a 5 GHz Unlicensed National Information Infrastructure ("U-NII") band.

16. The station apparatus of claim 9, wherein the processor is further configured to determine a video performance for the second frequency band from the correlation function.

17. A non-transitory computer readable medium with instructions stored therein which upon execution instruct at least one processor to:
  send broadcast packets to an access point in a first frequency band and waiting for confirmation,
  calculate a packet loss in the first frequency band based on a number of sent and confirmed broadcast packets, and
  calculate a packet loss for a second frequency band by taking into account the calculated packet loss in the first frequency band and by using a correlation function between a path loss in the first frequency band and a corresponding path loss in the second frequency band, wherein the first frequency band is lower than the second frequency band.

* * * * *